Figure 1:
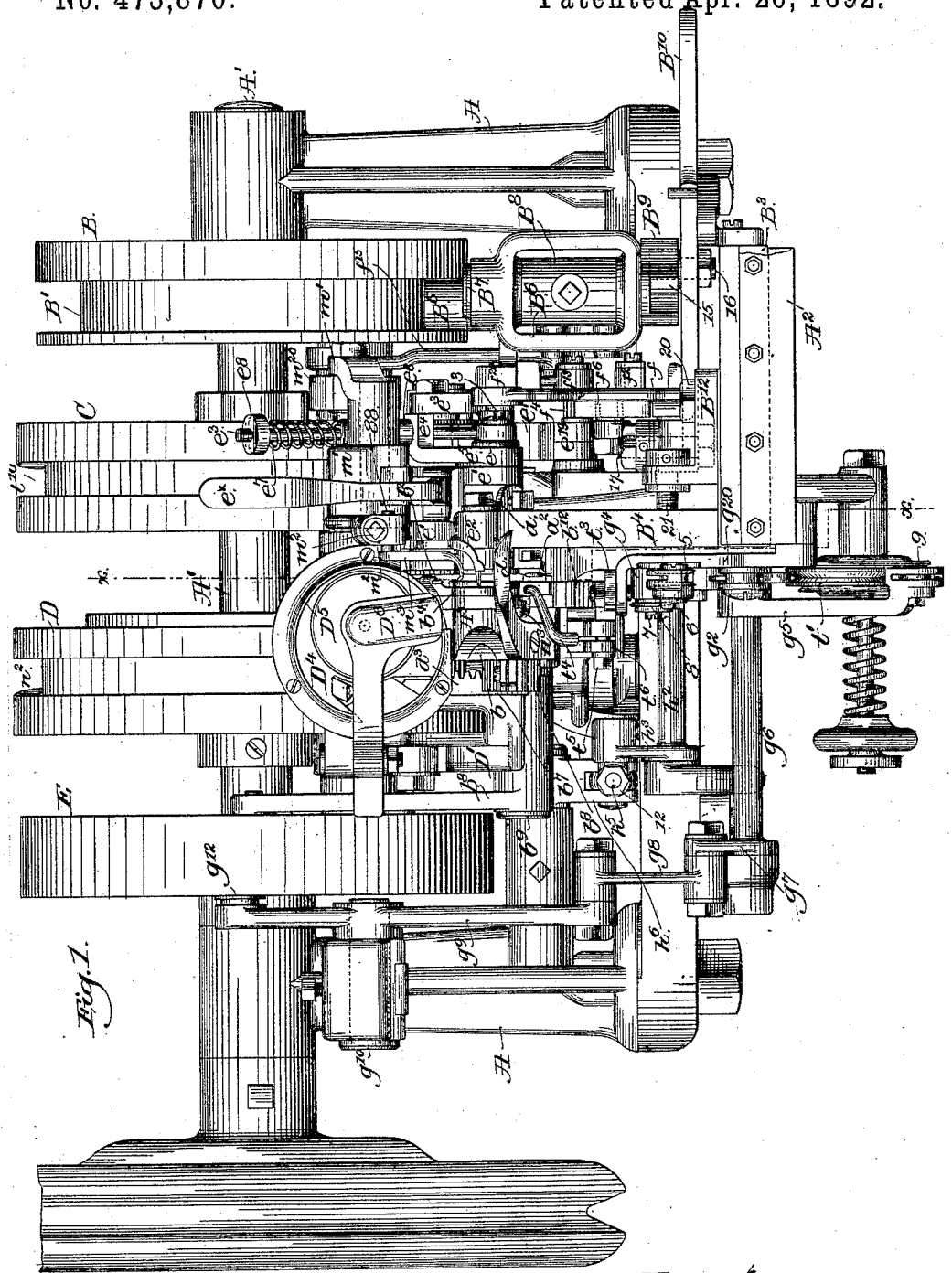

(No Model.) 9 Sheets—Sheet 1.

Z. T. FRENCH & W. C. MEYER.
SOLE SEWING MACHINE.

No. 473,870. Patented Apr. 26, 1892.

Witnesses.
Inventors.
Zachary T. French
William C. Meyer
by Crosby & Gregory Attys.

(No Model.) 9 Sheets—Sheet 2.
Z. T. FRENCH & W. C. MEYER.
SOLE SEWING MACHINE.
No. 473,870. Patented Apr. 26, 1892.

Witnesses.
John F. C. Prindlot
Edward F. Allen

Inventors.
Zachary T. French
William C. Meyer.
by Crosby & Gregory Attys.

(No Model.) 9 Sheets—Sheet 5.

Z. T. FRENCH & W. C. MEYER.
SOLE SEWING MACHINE.

No. 473,870. Patented Apr. 26, 1892.

Witnesses.
John F. L. Prinhurt
Edward F. Allen

Inventors.
Zachary T. French
William C. Meyer
by Lemby & Gregory Attys.

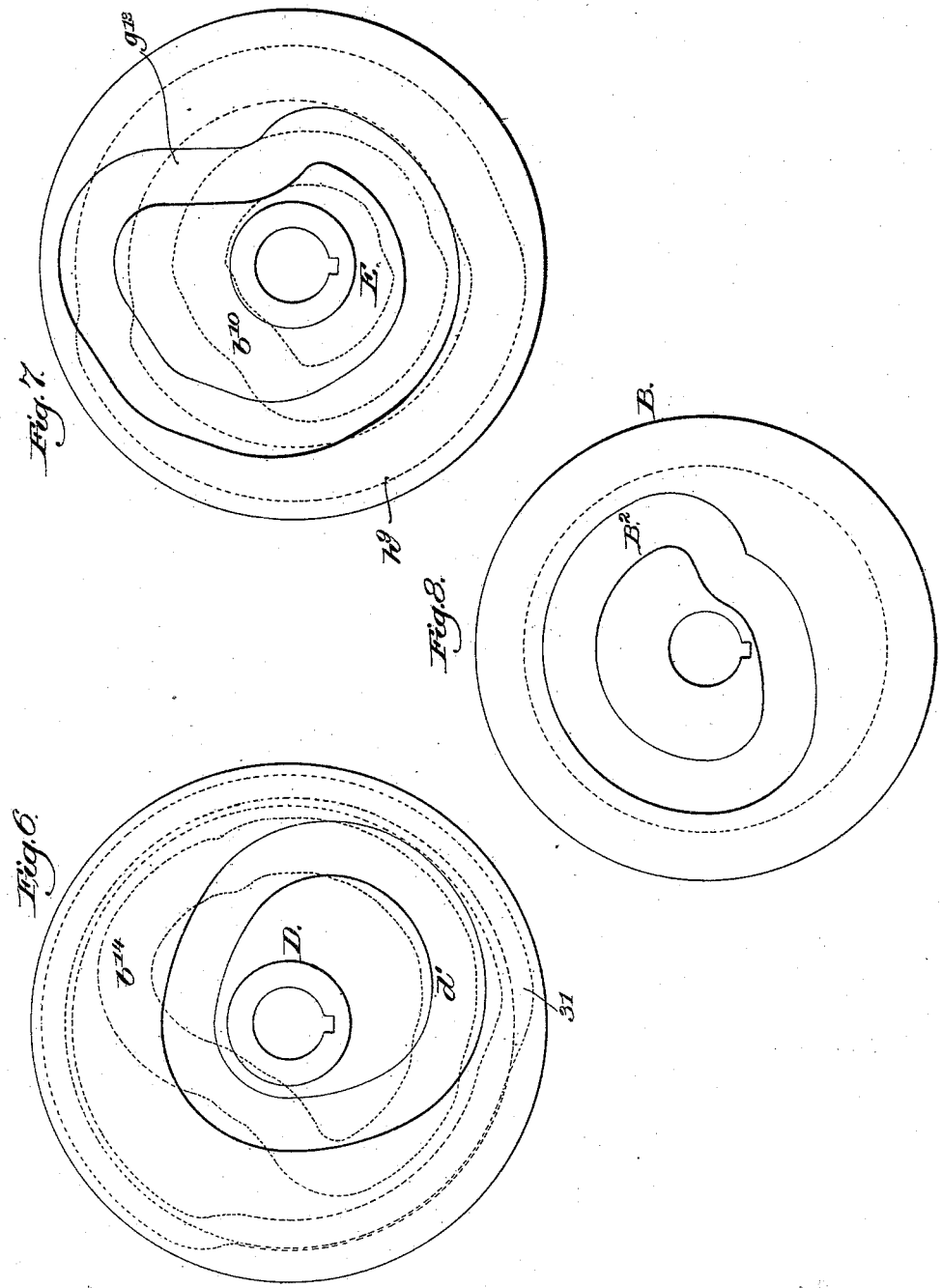

(No Model.) 9 Sheets—Sheet 7.
Z. T. FRENCH & W. C. MEYER.
SOLE SEWING MACHINE.
No. 473,870. Patented Apr. 26, 1892.
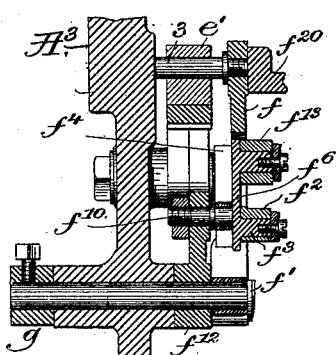
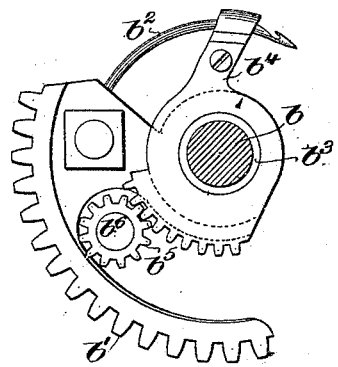
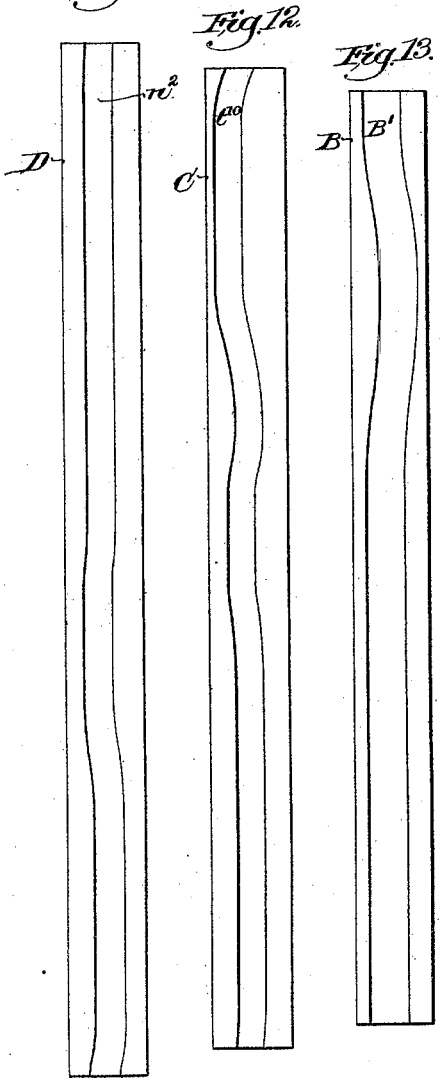
Witnesses.
John F. C. Poinkert
Edward F. Allen
Inventors.
Zachary T. French
William C. Meyer
by Crosby & Gregory attys.

(No Model.) 9 Sheets—Sheet 8.

Z. T. FRENCH & W. C. MEYER.
SOLE SEWING MACHINE.

No. 473,870. Patented Apr. 26, 1892.

Witnesses.
John F. C. Preinkloh
Edward F. Allen.

Inventors
Zachary T. French
William C. Meyer
by Crosby & Gregory attys

THE NORRIS PETERS CO., PHOTO-LITHO., WASHINGTON, D. C.

(No Model.) 9 Sheets—Sheet 9.
Z. T. FRENCH & W. C. MEYER.
SOLE SEWING MACHINE.
No. 473,870. Patented Apr. 26, 1892.
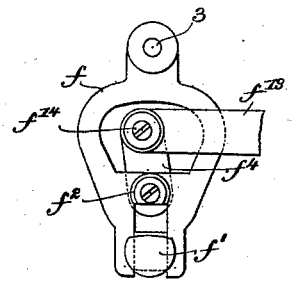
Fig. 16.
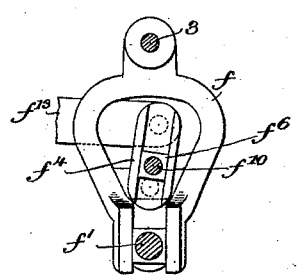
Fig. 17.
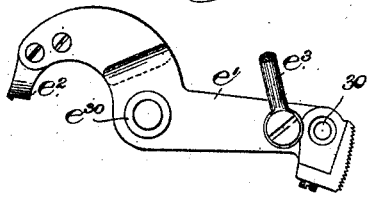
Fig. 18.
Fig. 19.
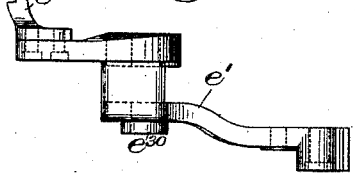
Fig. 20.
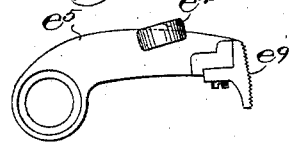
Fig. 21.
Witnesses
John G. L. Poindext
Edward F. Allen
Inventors
Zachary T. French
William C. Meyer
by Crosby & Gregory attys
THE NORRIS PETERS CO., PHOTO-LITHO., WASHINGTON, D. C.

UNITED STATES PATENT OFFICE.

ZACHARY T. FRENCH AND WILLIAM C. MEYER, OF BOSTON, MASSACHUSETTS, ASSIGNORS TO THE GOODYEAR SHOE MACHINERY COMPANY, OF HARTFORD, CONNECTICUT.

SOLE-SEWING MACHINE.

SPECIFICATION forming part of Letters Patent No. 473,870, dated April 26, 1892.

Application filed October 4, 1890. Serial No. 367,066. (No model.)

*To all whom it may concern:*

Be it known that we, ZACHARY T. FRENCH and WILLIAM C. MEYER, of Boston, county of Suffolk, State of Massachusetts, have invented an Improvement in Sole-Sewing Machines, of which the following description, in connection with the accompanying drawings, is a specification, like letters and figures on the drawings representing like parts.

The machine herein to be described is intended as an improvement upon that described in United States Letters Patent No. 412,703, dated October 8, 1889, the object being to simplify the construction and improve the operation of the parts in order that the machine may be run at greater speed and with less power, and instead of employing springs for various movements we have adopted cams and devices to insure positive motion.

We have improved the construction and operation of the parts instrumental in controlling the needle-thread, so that the stitch is better and more firmly set, the stitch being set while the work is under compression, the degree of which may be varied, according to the requirements of the stock. In the patent referred to the stock rested upon a movable work-support, the position of which was varied according to the thickness of the stock; but herein the work-support is stationary and the stock is acted upon by a presser-foot, the pressure of which on the stock is variable in extent, as required, the said presser-foot also acting automatically through variations in thickness of the stock to control the pulling off from the thread-supply of more or less thread, as required for the stitch to be made. We have also provided the machine with a positively-actuated thread-hook connected to a slide-bar, whereby the thread is so held and controlled that it will not be drawn across the hook of the needle while the loop is being formed by it. We have also provided the machine with means for positively actuating the needle-guide in both directions, it being made to cover and protect the hook of the needle while the loop of needle-thread is being drawn up by the take-up. We have made the awl and the parts for actuating it adjustable with relation to the needle to thus adapt it to needles of different diameters, and we have also made the thread-lifter adjustable horizontally to adapt it to the diameter of the needle used. We have so constructed the feed-slide and the parts for actuating it and adjusting the throw thereof, according to the length of stitch, that in any adjustment of the parts the needle will always register correctly with the awl-hole in the stock.

Figure 2:
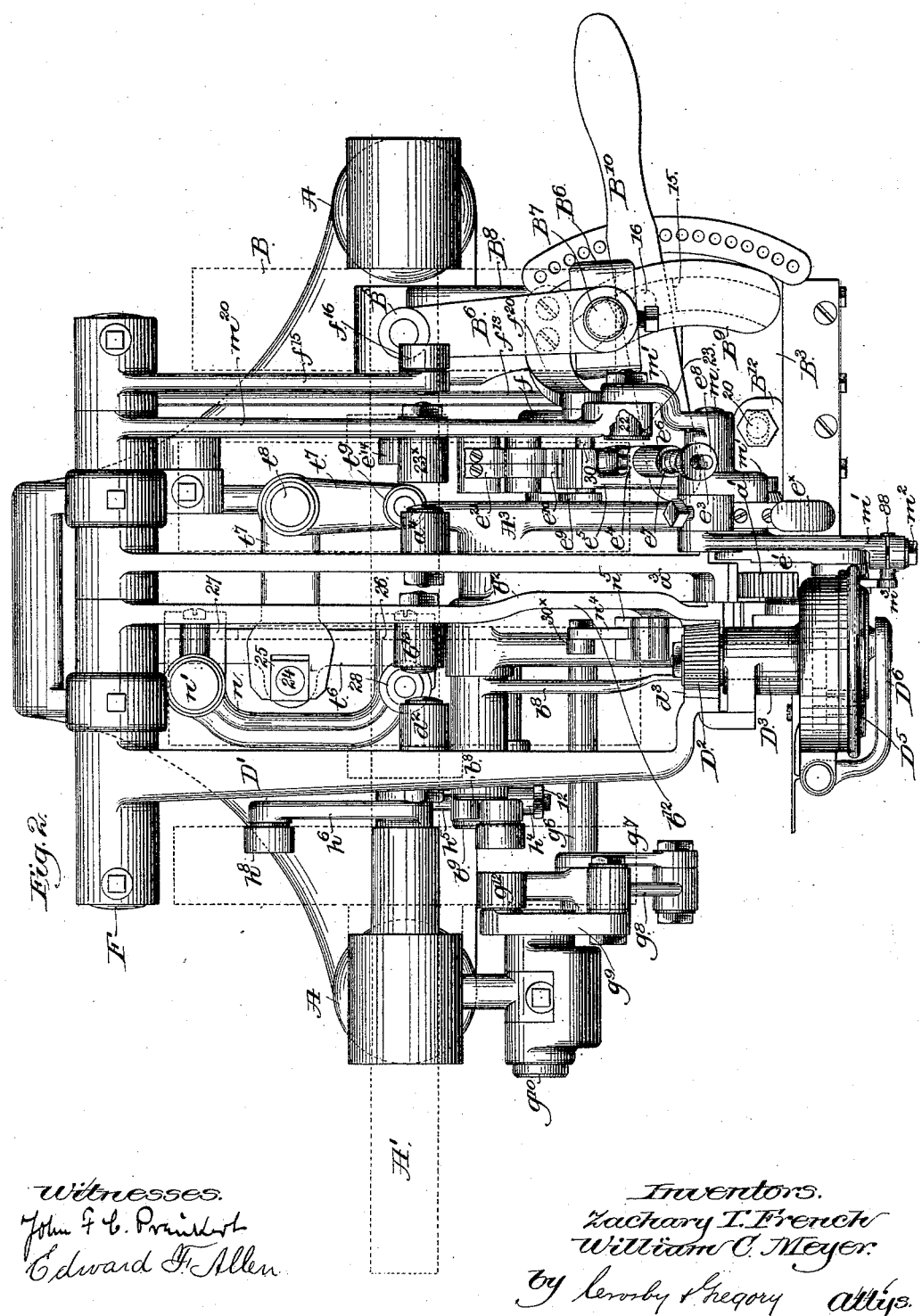
Figure 3:
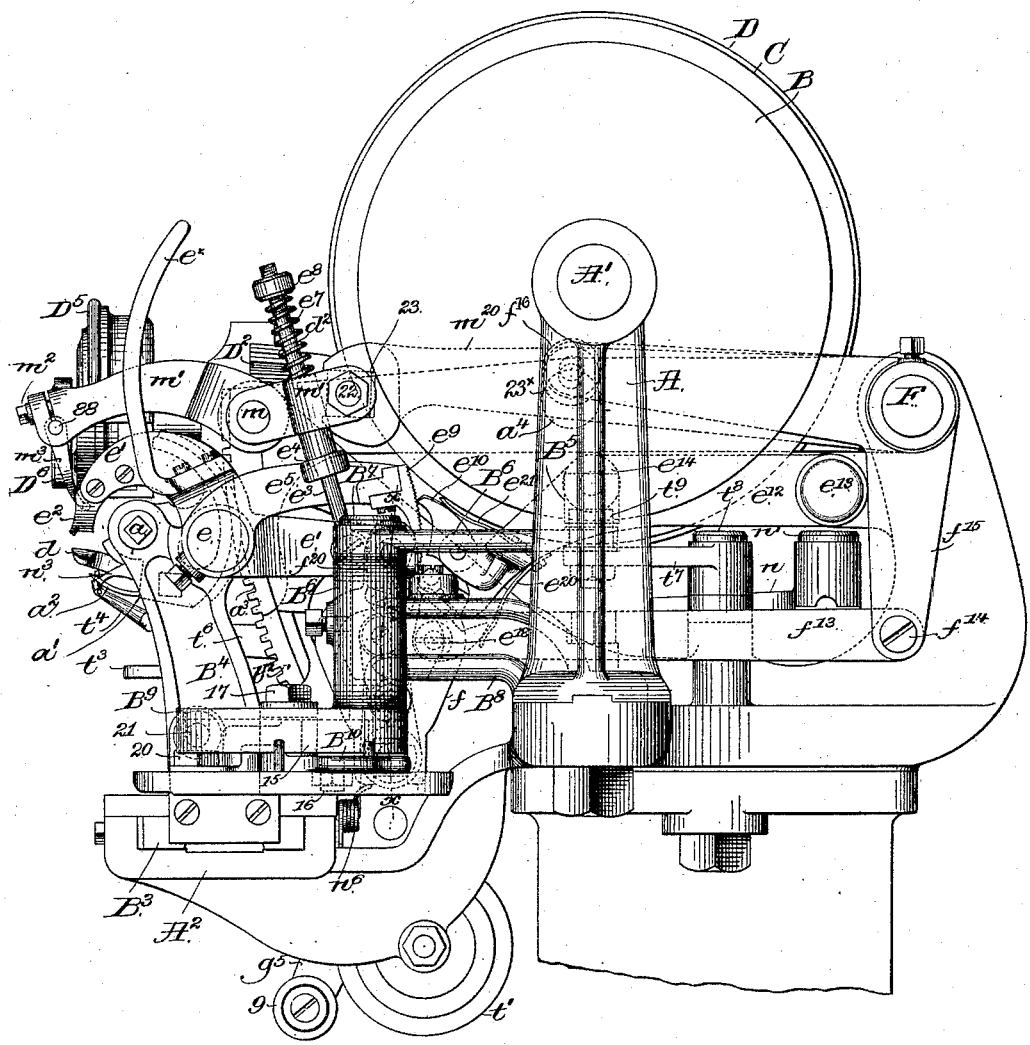
Figure 4:
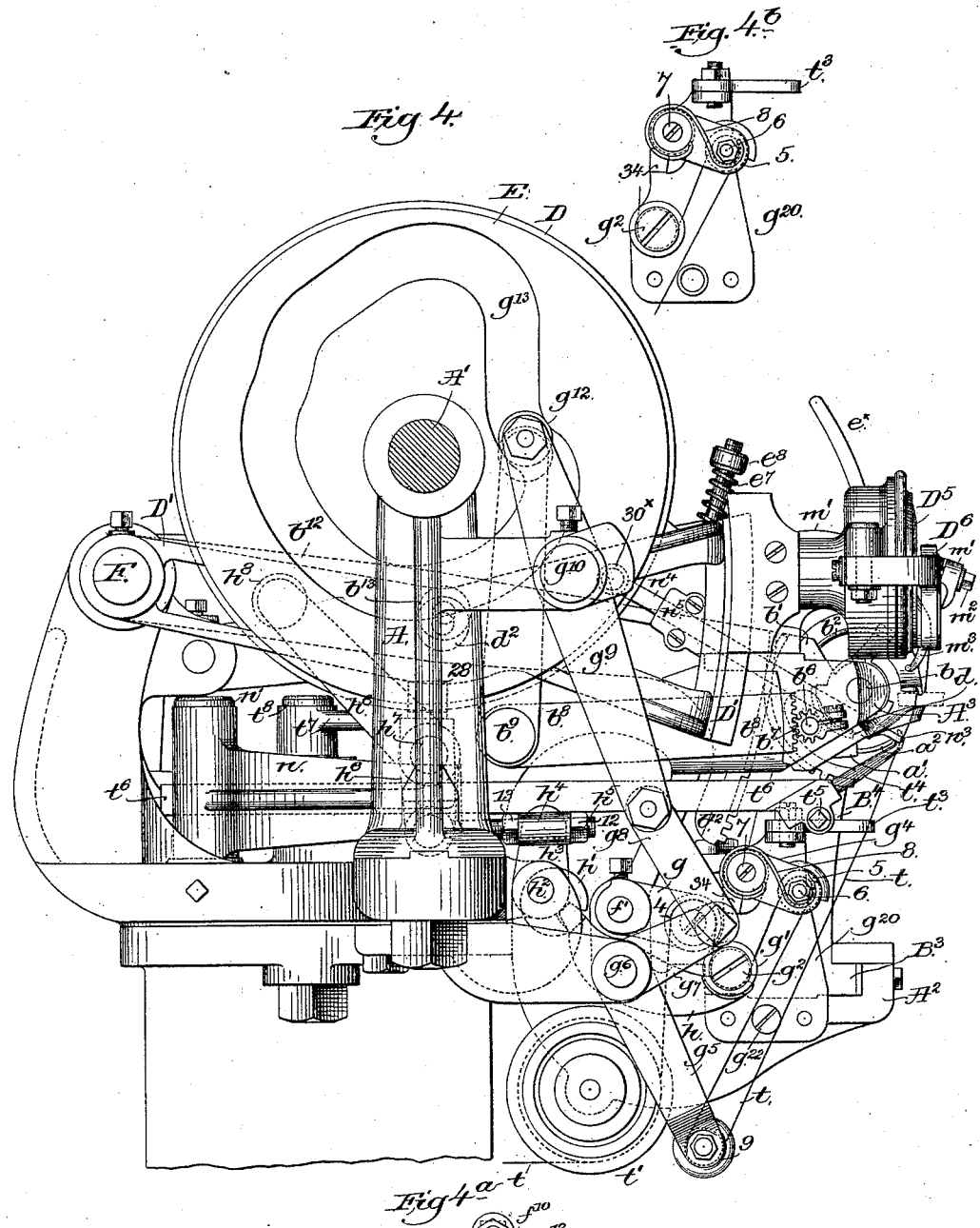
Figure 5:
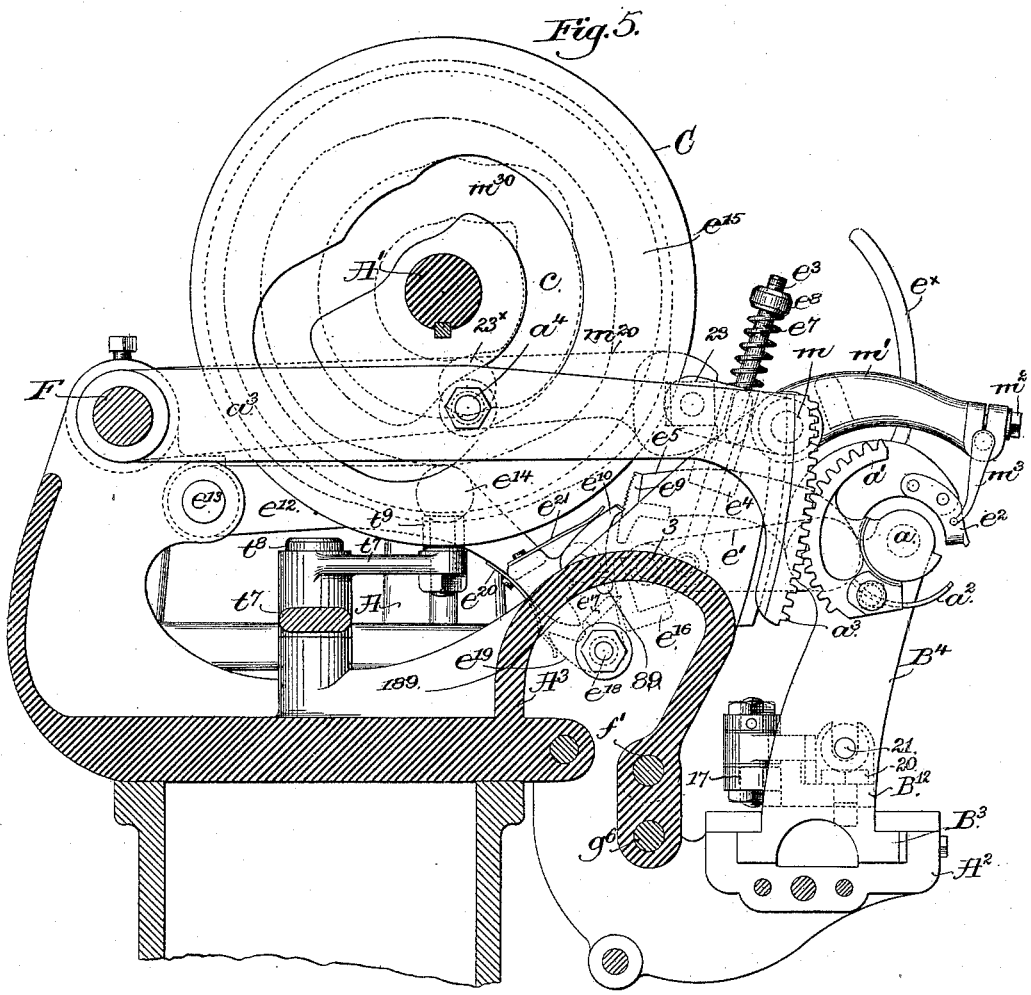
Figure 14:
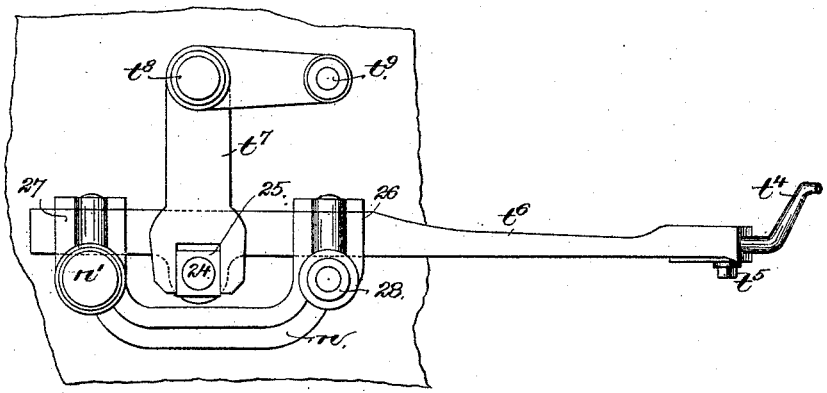
Figure 15:
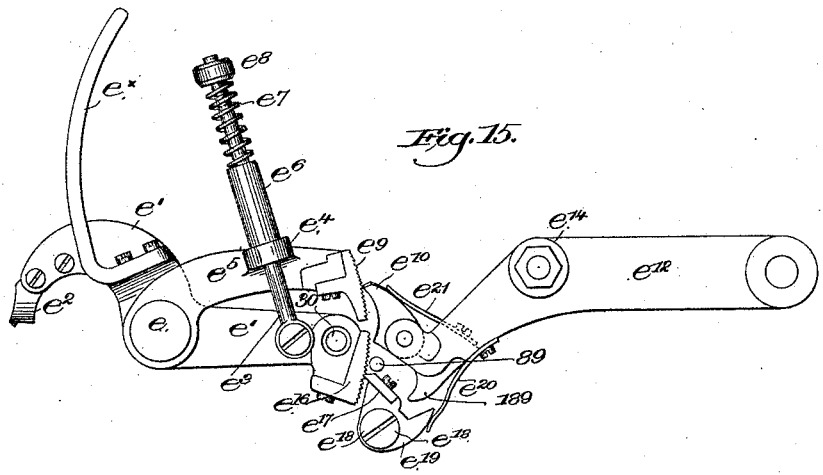

Figure 1 is a front elevation of a sufficient portion of a sole-sewing machine containing our improvements to enable our invention to be understood; Fig. 2, a top or plan view thereof, said figure showing the main shaft and the cams B C D E thereon by dotted lines, they being so shown to enable their position to be readily seen and yet leave the roller-studs and other parts actuated by them fully visible; Fig. 3, a right-hand end elevation; Fig. 4, a left-hand end elevation with the driving-pulley shown at the left in Fig. 1 removed, Figs. 4ª and 4ᵇ are details of the pull-off and auxiliary take-up. Fig. 5 is a section in the line $x$, Fig. 1. Figs. 6, 7, and 8 show, respectively, in full lines the needle-cam, take-up cam, and threaded feed-cam, the said figures also showing by dotted lines the shape of other cams to be referred to. Fig. 9 is a sectional detail in the line $x$, Fig. 3, chiefly to show the devices instrumental in varying the throw of the pull-off, said devices being under the control of the presser-foot; Fig. 10, an enlarged detail of the needle-carrying segment and its guide. Figs. 11, 12, and 13 are peripheral views of the cams B and C; Fig. 14, a detail showing the looper, its carrying-bar, and the yoke in which it slides; Fig. 15, a detail showing the presser-foot and the co-operating-pawls and ratchet-toothed dogs for holding and releasing the same and regulating its pressure on the stock; Figs. 16 and 17, details of the frame $f$, and co-operating parts operative in moving the pull-off for a variable distance according to the thickness of the stock. Figs. 18 to 21 are details showing the presser-foot and co-operating parts.

The frame-work A of the machine is and may be of suitable shape to support the working parts. This frame-work has suitable bearings for the main shaft A', having fast upon it a series of cams B C D E, the shaft being rotated in any usual manner. The cam B has a peripheral groove B', and a side groove B². (Shown in Fig. 8.)

The frame-work has a guide-box A², in which is fitted to move longitudinally the feed-slide B³, it having at its inner end an upright B⁴, which receives a fixed stud $a$, upon which is mounted loosely the usual awl-segment $a'$, (see Fig. 5,) to which is attached the awl $a^2$. The awl-segment derives its movement of oscillation from the segmental lever $a^3$, mounted loosely upon the stationary stud F, the said segmental lever having a roller or other stud $a^4$, which enters a groove $c$ in the left-hand side of the cam C.

The frame-work A has a rigid portion A³, the forward end of which supports the stud $b$, upon which is mounted loosely the needle-carrying segment $b'$, it having attached to it the curved hooked needle $b^2$. The segment $b'$ has a boss $b^3$, which receives upon it loosely the needle-guide segment $b^4$, the teeth of which (see Fig. 10) are engaged by the teeth of a pinion $b^5$, attached to or forming part of a rock-shaft $b^6$, extended loosely through the part A³ of the frame-work, the said rock-shaft having secured to it at its opposite end a clamp-pinion $b^7$, (shown in Fig. 4,) which is engaged and oscillated for the proper distance by means of a segmentally-toothed cam-lever $b^8$, of elbow shape, which is free to turn upon a stud $b^9$, the upwardly-extended arm of the said lever $b^8$ having a roller or other stud, which enters the cam-groove $b^{10}$ in the right-hand side of the cam E, the shape of the said cam-groove being designated by dotted lines in Fig. 7. The needle-carrying segment $b'$ derives its motion from the segmentally-toothed lever $b^{12}$, fulcrumed at its rear end upon the stationary stud F referred to, the said lever having a roller or other stud $b^{13}$, which enters a suitable groove $b^{14}$ in the right-hand side of the cam D, the shape of the said groove being shown in dotted lines, Fig. 6.

Prior to this invention it has been customary to provide the needle-guide segment with a slot, which was entered by a pin carried by the needle-segment, the needle-guide segment being controlled as to its movement toward the stock by a spring and being lifted or carried away from the stock by means of the pin referred to carried by the needle-segment.

In this invention the needle-guide segment is moved positively in both directions, which enables us to so operate the needle-guide segment that when the needle has been drawn back and the loop of thread removed from its hook the guide may be made to cover the barb of the hook, and thus obviate any possibility of the loop of needle-thread just discharged from it from being again caught upon the hook of the needle during the making of the stitch. In prior machines whenever the loop caught upon the hook of the needle after having been once discharged, the thread then being drawn up to complete the stitch and inclose the shuttle-thread, was broken.

The portion A³ of the frame-work before referred to has connected to it by a suitable screw the work-support $d$, which in this instance of our invention is stationary.

The cam D referred to has at its left-hand side a groove $d'$, which receives a roller or other stud $d^2$, carried by a lever D', having at its front end segmental teeth $d^3$, which engage a pinion D² fast on the shuttle-driving shaft D³, (shown by dotted lines in Fig. 2,) said shaft having at its outer end a shuttle-driver which by contact with the shuttle D⁴ oscillates the same in the race D⁵. The said shuttle, its race D⁵, and its bobbin-case, and the arm D⁶, which co-operates with the said bobbin-case to prevent it from rotating, are and may be all as in United States Patent No. 424,966, granted to us on the 8th day of April, 1890. It will be understood that the awl remains in the stock while the latter is fed over the work-support in usual manner.

In this present invention we have provided the upright B⁴ with a bearing-stud $e$, on which is mounted loosely an elbow-shaped lever $e'$. (Best shown in Figs. 1 and 3, and also in Figs. 15, 18, and 19, where said lever is represented detached.) The lever $e'$ at its front end has attached to it the presser-foot $e^2$, and at its rear end the said lever has jointed to it a link $e^3$, which is extended loosely through a lug $e^4$ of an arm $e^5$, mounted loosely upon a boss $e^{30}$, (see Figs. 4 and 5 of the lever $e'$,) the link $e^3$ above the said lug receiving upon it a washer $e^6$, acted upon by a spiral spring $e^7$, adjustable as to its force by a nut $e^8$, screwed upon a threaded part of the said link. The rear end of the arm $e^5$ is provided with a ratchet-toothed dog $e^9$, which is engaged at times by one or more pawls $e^{10}$, varying, preferably, in length, to thus provide in usual manner for finer adjustments, said pawls being pivoted upon a lever $e^{12}$, having its fulcrum on a stud $e^{13}$ and provided with a roller or other stud $e^{14}$, which enters a groove $e^{15}$. (See Fig. 1 in the right-hand side of the cam C.) The inner end of the lever $e'$ is also provided with a ratchet-toothed dog, as $e^{16}$, (see Figs. 1 and 4,) which dog is engaged by a pawl $e^{17}$, mounted loosely upon a stud $e^{18}$, connected with the rigid projection A³ of the frame-work, the said pawl having a rearward extension $e^{19}$, which is normally acted upon by a spring $e^{20}$, carried by the lever $e^{12}$, which spring normally keeps the said pawl in engagement with the dog $e^{16}$. The pawls $e^{10}$ are likewise acted upon by a suitable spring $e^{21}$, which normally keeps them in engagement with the ratchet-toothed dog $e^9$. The normal pressure of the presser-foot upon the stock may be increased or decreased, according to the character of the stock, by the rotation of the nut $e^8$.

The rear end of the lever $e'$ has a transverse hole 30, in which is fitted to slide longitudinally a pin 3, (shown best in Fig. 9,)

which is extended horizontally from a frame $f$, slotted at its lower end to embrace and be guided by a rock-shaft $f'$, (see Figs. 16 and 17,) mounted in the frame $A^3$. (See Fig. 9.) This frame $f$ has, as shown, a boss $f^2$, (see Figs. 9 and 16,) which receives a stud $f^3$, projecting from a slide-box $f^4$, which receives in its groove a loose block $f^6$, (shown in section in Fig. 9,) the said block being mounted upon the end of a stud-screw $f^{10}$, carried by an arm $f^{12}$, fast upon the rock-shaft $f'$.

The upper end of the slide-box $f^4$ has a suitable stud or projection, which is embraced by the end of a connecting-rod $f^{13}$, jointed at $f^{14}$ to an elbow-lever $f^{15}$, having its fulcrum on the long stud F, the inner end of the said lever having a roller or other stud $f^{16}$, (shown by dotted lines in Fig. 3,) which enters the cam-groove $B^2$ at the left-hand side of the cam B.

To prevent accidental tipping out of vertical position of the frame $f$, we have provided the machine with an abutment $f^{20}$, which serves as a guide for the frame, while one face of the frame $A^3$ serves as a guide for the inner end of the pin 3.

It will be understood that the frame $f$ rises and falls with the lever $e'$ and that the slide-box, rising and falling with it, occupies different positions with relation to the block $f^6$ on the stud-screw $f^{10}$; but in all positions of the frame $f$ the vibrations of the slide-box about its fulcrum, which is the stud $f^3$, are the same, and consequently the rock-shaft $f'$ will receive a greater or less movement, according to the position of the said frame $f$.

The position of the frame carrying the slide-box is made variable, according to the thickness of the stock upon which the presser-foot rests. This variation in the position of the frame $f$ is made available as a means by which to automatically vary the amount of needle-thread which is to be drawn off from the thread-supply to accommodate for the thickness of stock being operated upon, it being understood that enough thread is to be drawn off from the thread-supply preparatory to making each stitch for the next stitch to be made. The thread is so drawn off by a pull-off composed of an arm $f^{12}$, fast upon the rock-shaft $f'$, the said shaft having at its left-hand end, viewing the front of the machine, an arm $g$, (shown separately in Fig. 4$^a$,) which is provided with a sheave 4, about which the thread $t$ is led from the tension device or thread-supply $t'$. The thread $t$ is carried from the said sheave 4 under a sheave $g'$, mounted upon a stud-screw $g^2$, and thence up over a sheave 5, mounted upon a stud 6 of the arm of the auxiliary take-up $g^4$, mounted loosely on a stud 7, the said arm $g^4$ being acted upon by a suitable spring 8, which normally keeps the sheave 5 elevated. The screw $g^2$ and stud 7 are screwed into a stand $g^{20}$, attached by a screw $g^{22}$ to the frame-work. (See Figs. 1 and 4.) From this sheave 5 the needle-thread is carried down about the sheave 9 on the take-up lever $g^5$, forming part of a rock-shaft $g^6$, and having an arm $g^7$ at right angles to the arm $g^5$, which arm by link $g^8$ is jointed to a lever $g^9$, having as its fulcrum a stud $g^{10}$, the upper end of the said lever having a roller or other stud $g^{12}$, which enters a cam-groove $g^{13}$ (see Fig. 4) at the left-hand side of the cam E. The rock-shaft $g^6$, forming part of the take-up lever, as herein represented, is reduced near one end to receive the thread-clamping lever $h$, the front end of which is concaved to fit a groove in the sheave $g'$ and come directly in contact with the needle-thread to clamp the same and hold it firmly in place, not only while the take-up acts to set the stitch, but also while the pull-off acts to pull off thread from the thread-supply, the said clamping-lever acting substantially as does the clamp bearing the number 5 in Patent No. 412,703, granted to us October 8, 1889; but in said patent the said clamp was controlled as to its strength by springs, whereas in this present invention the clamp is actuated positively, as will be described.

Referring to Fig. 4, it will be seen that the rear end of the clamp-lever $h$ has a toe, which enters a notch in an arm $h'$, connected to or forming part of a rock-shaft $h^2$, having an upwardly-extended arm $h^3$, having a hole for the reception of the shank of a T-shaped stud $h^4$, through which is extended and made adjustable by nuts 12 13, a link $h^5$, jointed to the lower end of a lever $h^6$, having its fulcrum at $h^7$ in a suitable stand upon the frame-work, the upper end of the said lever having a roller or other stud $h^8$, (shown by dotted lines in Fig. 4,) which enters the cam-groove $h^9$. (Shown by dotted lines in the right-hand side of the cam E, see Fig. 7.) By the adjustment of the nuts 13 14 it is possible to clamp the thread between the clamping-lever and the stud $g'$ with any desired pressure and at just the desired time, that depending upon the size of the thread.

The groove $B'$ in the periphery of the cam B receives a roller or other stud $B^5$, extended from a lever $B^6$, having as its fulcrum a stud $B^7$ in a stand $B^8$, one end or arm of the said lever, as $B^9$, (see Fig. 1,) being provided with a groove for the reception of a block 15, mounted loosely on a stud 16, (shown by dotted lines, Fig. 2,) carried by the feed-regulating lever $B^{10}$, having as its fulcrum a stud 17, erected upon an ear $B^{12}$ of the feed-slide $B^3$. The groove in the under side of the arm $B^9$ is arc-shaped and is struck from the center or fulcrum 17, about which the said lever turns. By making this groove arc-shaped rather than straight, as heretofore customary in sole-sewing machines, it is possible to adjust the feed to its extremes without, as heretofore, adjusting the feed-cam, and it is also possible to dispense with the eccentric stud upon which the said feed-regulating lever has commonly been mounted.

In this present machine the feed-regulating lever may be moved to regulate the length of feed, and yet the needle, when it approaches the stock, will always register with or enter correctly the hole made in the stock by the awl.

The feed-slide has connected to it in an adjustable manner by a bolt 20, an ear $B^{12}$, an upright part of which ear receives an adjusting-screw 21, which besides engaging the ear is screwed into the upright $B^4$. This adjusting-screw by its rotation adjusts the feed-slide and the parts carried by it, so as to adapt them to needles of different diameter. The lever $e'$ has connected to it a hand-lever $e^\times$, by which the presser-foot may be lifted when it is desired to remove or replace work upon the work-support.

The frame-work of the machine has a suitable stud $m$, upon which is mounted a lever $m'$ of irregular shape. (Best shown in Figs. 2 and 3.) The forward end of this lever has secured to it by screw $m^2$ the thread-lifter $m^3$, or the device which engages the loop of thread drawn through the stock by the hooked needle, takes the said loop from the needle and opens and spreads it preparatory to the entrance therein of the point of the shuttle $D^4$. By loosening the clamp-screw $m^2$, which embraces a projection 88 of the thread-lifter, the said lifter may be adjusted toward and from the needle in any direction to enable it to operate properly with a needle of any desired diameter, this being important for the best sewing. In the present instance the lever $m'$ has a stud 22, which is provided with a loose block 23, preferably square, and shown in Fig. 2 by breaking away the end of the lever $m^{20}$, where it is grooved for the reception of the said block. The lever $m^{20}$ has its fulcrum on the stud F and is provided with a roller or other stud $23^\times$, which enters a cam-groove $m^{30}$ (shown by dotted lines in Fig. 5) in the right-hand side of the cam C. The needle-thread $t$, from the take-up lever described, is fed through a hole in a suitable eye-piece $t^3$ and thence through a hole in a looper $t^4$, which is clamped by a screw $t^5$ to the looper-carrying slide $t^6$, (shown in Fig. 2 and separately in Fig. 14,) the said slide having a stud, as 24, on which is mounted loosely a block 25, which is embraced by the forked end of an elbow-lever $t^7$, having its fulcrum on a stud $t^8$, the said lever at its opposite end having a roller or other stud $t^9$, which enters the peripheral groove $t^{10}$ in the cam C. The slide-bar $t^6$ slides in bearings 26 27 of a yoke $n$, having its fulcrum on a stud $n'$, the said yoke having a roller or other stud 28, which enters the peripheral groove $n^2$ in the cam D.

From the foregoing description it will be understood that the looper may be made to describe a somewhat irregular or elliptical path about the hook of the needle to thus deliver the needle-thread to the needle while the latter is through the stock.

To obviate the rending of the needle-thread across the hook of the needle while the latter is drawing the loop of needle-thread through the stock, we have provided the machine with a thread-holder $n^3$, which is made as a hook at the lower end of a slide-bar $n^4$, fitted to slide in a guide-box $n^5$, fixed to or forming part of the frame-work, the inner end of the said bar having a roller or other stud $30^\times$, (shown by dotted lines, Fig. 4, and full lines Fig. 2,) which enters a cam-groove 31 in the right-hand side of the cam D, said groove being shown by dotted lines in Fig. 6. The sole or other thing to be stitched is placed upon the work-support, and the presser-foot is allowed to descend upon the work, it being kept upon the work by a force measured by the spring $n^6$, (see Fig. 3,) one end of which bears against the lower end of the frame $f$. In this condition the pawls $e^{10}$ and $e^{17}$ engage, respectively, the dogs $e^9$ and $e^{16}$, and the lever $e^{12}$ is moved, causing the pawl $e^{10}$, engaging the dog $e^9$, to turn the arm $e^5$ about its pivot, causing the lug $e^4$, acting on the washer $e^5$, to lift the presser-foot $e^3$, the spring at such time yielding so as to hold the stock firmly but with a yielding pressure against the spring $e^7$, thus lifting the rod $e^3$ and the rear end of the lever $e'$ carrying the presser-foot, it then resting on the stock, and as the rear end of the presser-carrying lever $e'$ is raised the pawl $e^{17}$ engages the dog $e^{16}$ and holds the presser-foot down firmly against the stock, which it depresses at the stitch-making point. The stock being clamped, the awl rises and perforates the stock. After the awl is through and well into the stock and before it commences to feed the stock, the lever $e^{12}$ is moved so that one end thereof strikes the extension $e^{19}$ of the pawl $e^{17}$, thus releasing the latter from the dog $e^{16}$, the lever at the same time releasing the pawls $e^{10}$ from the dog $e^9$. This leaves the presser bearing upon the stock by a force due only to the spring $n^6$, and at this time the feed takes place in usual manner by a horizontal movement of the feed-slide. Just as the awl starts to rise the looper is moved automatically toward the left, viewing the front of the machine, and it remains in its backward position and places its thread behind the hook of the thread-holder $n^3$, which is then in its forward position. While the awl is in the stock and the latter is being fed, the thread-holder $n^3$, by cam-groove 31, is drawn in, it engaging the needle-thread and holding the same. While the awl is being retracted the needle comes down and enters the hole made in the stock by the awl, and the awl and presser-foot are moved back again to the right, and when back the pressure is again put onto the presser-foot through the lever $e'$ by the pawls, as before described. During the traverse of the needle through the stock, the thread-carrying looper is moved forward and to the right, viewing Fig. 1, to lay its thread into the hook of the needle $b^2$. The needle having reached its lowermost point and having received upon it the needle-thread between the end of the looper and the thread-holder, the needle commences to draw a loop, and the thread-holder moves forward to give up to the needle the thread held by it, such thread being in loop form and of a length sufficient to obviate the rending of the thread across the hook of the needle as the latter rises to draw the loop. While the needle is drawing its loop through the stock, the take-up $g^5$ rises slightly and gives up some of its thread, as required, not only by the needle but by the thread-lifter and the shuttle, it being understood that the thread-lifter $m^3$ engages that side of the loop of thread drawn up by the needle which is extended to the thread-supply, the thread-lifter acting upon the said loop while it is held by the hook of the needle to thus expand the same for the entrance of the point of the shuttle, and as soon as the point of the shuttle is well into the loop the loop is discharged from the lifter and off the hook of the needle onto the shuttle, this being done while the shuttle is being carried through the loop of needle-thread. Then the needle-guide segment is moved forward sufficiently to cover the barb of the needle and prevent the catching of the loop of needle-thread upon the needle as the said loop is being cast off from the shuttle. While the shuttle is being passed through the loop of needle-thread, the thread pull-off is moved down to give up to the auxiliary take-up $g^4$ the thread held by it, and immediately thereafter the take-up $g^5$ starts to descend to take up the loop and set the stitch, and as the take-up starts down the clamp $h$ comes upon the needle-thread, clamping it firmly against the sheave $g'$ and holding it there, and while the take-up completes its stroke to set the stitch the latter part of the movement of the take-up draws the auxiliary take-up down against a stop 34. While the thread is so locked and just as the awl is about rising again through the stock, the thread pull-off is raised by or through the action of the rock-shaft $f'$, before described, and its sheave 4 is made to pull off from the thread-supply or tension device sufficient thread for the next stitch to be made, the extent of movement of the said pull-off being governed, it will be remembered, by the position of the frame $f$, which is variable, according to the thickness of stock under the presser-foot.

In the machine herein described it will be noticed that all the levers which are horizontal, or substantially so, are pivoted upon a stationary shaft located below the center of the cam-shaft, and the roller or other studs carried by the said levers are engaged by the cam-grooves at points below the said cam-shaft. This construction saves power and insures easier movements or movements without jar, which results also in the saving of wear upon the parts and is a matter of very considerable importance, and owing to said construction the machine may be run at greatly-increased speed without breakage of parts or without tremulous motions to disarrange the proper working of the parts.

Referring to Fig. 15, the stud 89 during the downward movement of the left-hand end of the lever $e^{12}$ acts to disengage the pawl $e^{10}$ from the dog $e^9$, and at the same time the end 189 of the said lever acts on the extension $e^{19}$ of the pawl $e^{17}$ to disengage it from the dog $e^{16}$.

We have herein shown and described certain apparatus for actuating and controlling the presser-foot, but the said apparatus is not herein claimed, because the same is made the subject-matter of claim in application, Serial No. 384,407, filed March 10, 1891.

We claim—

1. The presser-foot-carrying lever, a stud about which it is free to oscillate, a reciprocating or sliding frame $f$, connected to the said lever at one end, the needle and complemental stitch-forming mechanism, and a pull-off independent of the said needle, combined with intermediate devices between the said frame and the rock-shaft carrying the pull-off, whereby the rise and fall of the presser-foot upon varying thicknesses of stock results in lowering and raising said frame to thus increase or decrease the amount of thread pulled off by the pull-off, substantially as described.

2. A circularly-moving shuttle, its race or guide, and a thread-lifter to engage the needle-thread and aid in opening the loop formed in the said thread for the entrance of the shuttle, a hooked needle, and its segment, combined with the needle-guide independent of said needle, its segment, shaft $b^6$, pinion $b^5$, and clamp-pinion $b^7$, attached to said shaft, and the toothed sector-lever $b^8$, and means to actuate the lever and thereby oscillate said needle-guide positively to cover the hook of the needle while the shuttle is passing through the loop cast off from the said needle, substantially as described.

3. The work-support, the lever $e'$, the presser-foot, the pin 3, and the frame $f$, made movable by the presser-foot lever, according to variations in thickness of the stock between the presser-foot and work-support, combined with the slide-box, means to move it, connections between it and the said frame, the thread pull-off, the rock-shaft to which it is attached, and connections between the said rock-shaft and the slide-box, substantially as described.

4. The hooked needle to draw a loop of thread through the stock, combined with the thread-lifter to engage the loop of needle-thread and aid in opening the said loop for the passage of the shuttle through it, the lever $m'$, to which the said lifter is attached, the lever $m^{20}$, and the grooved cam to actuate the lever $m^{20}$ positively, as and for the purpose set forth.

5. The hooked needle, the presser-foot-carrying lever, the stud about which it is free to oscillate, a reciprocating sliding frame $f$, connected to the said lever at one end and guided at its other end, an oscillating slide-box pivoted on said frame, and a pull-off, combined with intermediate devices between the said slide-box and the rock-shaft carrying the pull-off, whereby the rise and fall of the presser-foot upon varying thicknesses of stock lowers and raises the said frame to increase and decrease the amount of thread pulled off by the pull-off, substantially as described.

6. The presser-foot-carrying lever, the frame $f$, and the pin 3, carried thereby and entering the said lever loosely, and a pull-off and connections between it and the said frame, combined with the horizontally-movable feed-slide and its upright provided with a fulcrum-stud for the said lever and with an abutment to keep the said frame from being strained out of place, substantially as described.

7. The curved needle, the looper, its slide-bar, a pivoted yoke containing the said slide-bar and having a roller or other stud, a lever $t^7$, connected with the said slide-bar and having a roller or other stud, and the shaft $A'$, combined with the cams C D, having grooves to receive the roller-studs on the lever $t^7$ and the said yoke, the said rollers or other studs being in substantially the vertical plane of the longitudinal center of the said shaft, whereby the lever and yoke are made to move the looper positively, substantially as described.

8. The main take-up $g^5$, the pull-off, and the sheave $g'$, located between them, combined with the pivoted clamping-lever $h$, the rock-shaft $h^2$ and its arms, a link $h^5$, and means to connect it with one of the arms of the said rock-shaft in an adjustable manner to provide for the diameter of the thread being used, and the lever $h^6$, whereby the said clamping-lever is moved, and means to positively actuate said rock-shaft to clamp the needle-thread positively at the proper time, substantially as described.

9. The sheave $g'$, the clamping-lever $h$, the rock-shaft having an arm to engage one end of the clamping-lever and having a second arm $h^3$, combined with the lever $h^6$, means to actuate said lever, and adjustable connections between said lever $h^6$ and the arm $h^3$ of the rock-shaft, whereby the clamping-lever may be made to clamp the thread with any desired pressure and at the desired time, substantially as described.

10. The hooked needle to draw a loop of thread through the stock, the lever $m'$, and the thread-lifter having a laterally-extended projection fitted into a hole in the said lever, combined with means to clamp the said projection in the said lever, the said projection being freely adjustable in said lever both toward and from the said needle and about the said projection as a center to thereby enable the said thread-lifter to be placed in correct position with relation to the needle, according to the diameter of the latter, substantially as described.

11. The hooked needle and the looper, combined with the guide-bar $n^5$, the slide-bar $n^4$, fitted to slide in the said guide-bar and having the thread-hook $n^3$ at one end and a roll at its opposite end, and a cam to receive said roll and actuate the said slide-bar positively to enable its hook to engage the needle-thread between the stock and the looper preparatory to the needle drawing the loop through the stock to thus aid in forming a loop of the proper length to avoid the rending of the needle-thread across the hook of the needle.

In testimony whereof we have signed our names to this specification in the presence of two subscribing witnesses.

ZACHARY T. FRENCH.
    WILLIAM C. MEYER.

Witnesses:
 GEO. W. GREGORY,
 EMMA J. BENNETT.